Jan. 3, 1956            D. E. FREY            2,728,992
HEIGHT GAUGE AND METHOD OF USING SAME
Filed Jan. 21, 1955            2 Sheets-Sheet 1
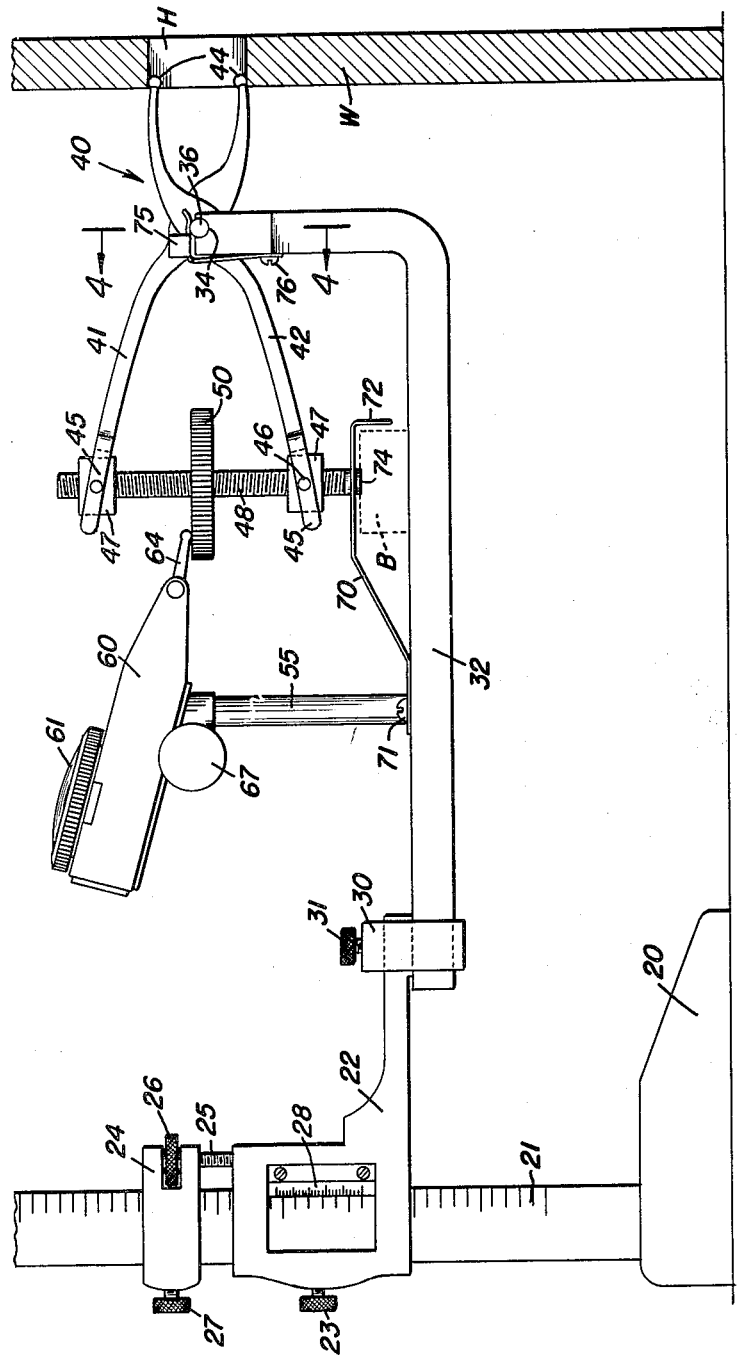
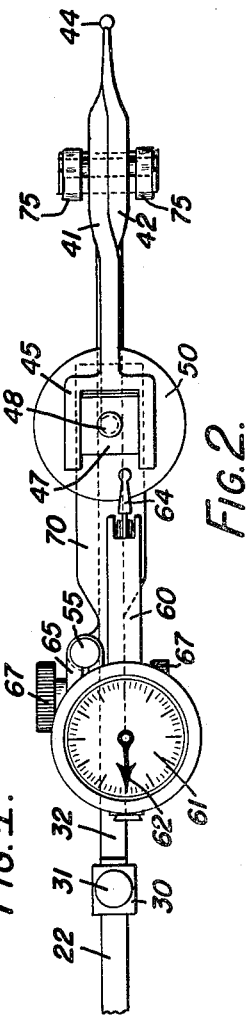
INVENTOR.
DEWEY E. FREY
BY
ATTORNEY

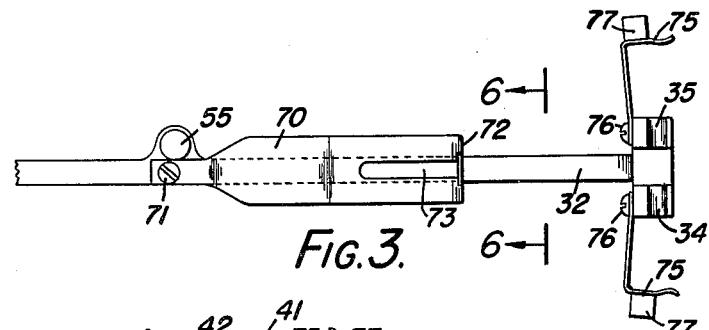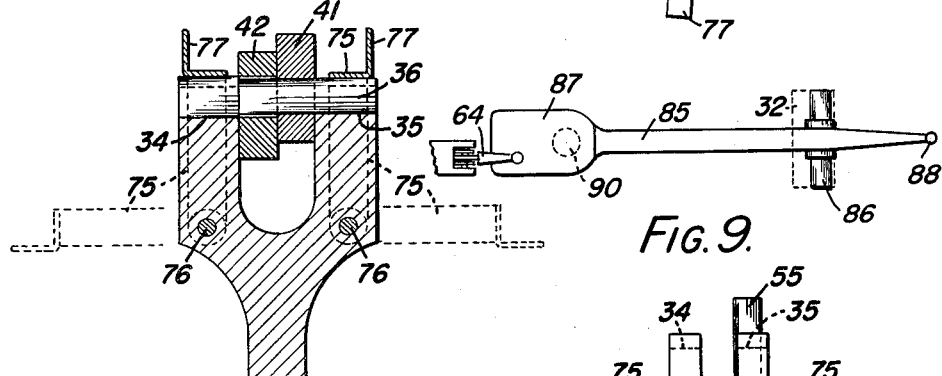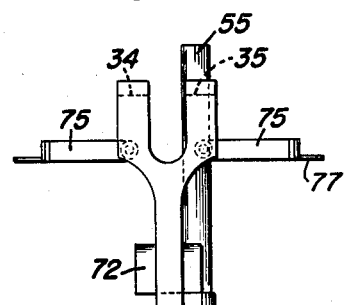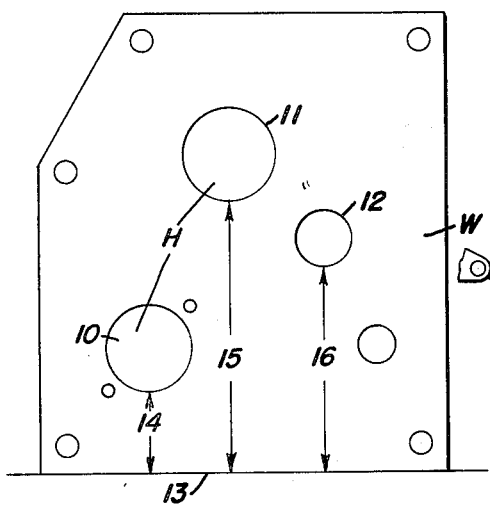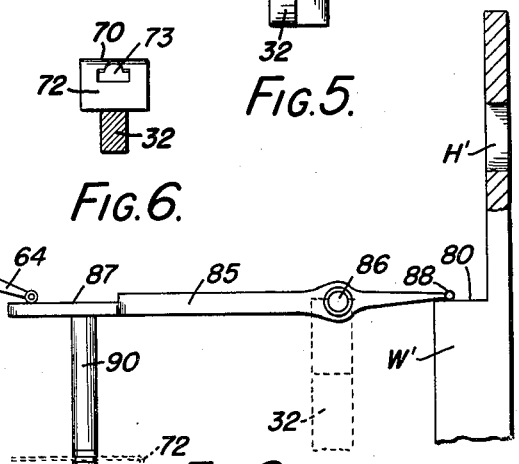

United States Patent Office 2,728,992
Patented Jan. 3, 1956

2,728,992
HEIGHT GAUGE AND METHOD OF USING SAME

Dewey E. Frey, Rochester, N. Y.

Application January 21, 1955, Serial No. 483,266

7 Claims. (Cl. 33—172)

The present invention relates to gauges, and particularly to height gauges for measuring the center line spacing of holes in a workpiece.

When measuring the center distance of the holes in any plate having a plurality of holes in it, such as a shaft end plate for a gear train, it has been necessary heretofore to measure the diameter of each hole, the height of the bottom edge of each hole above the bottom edge of the plate or from a reference point, to add half the diameter of one hole to the distance of its bottom edge from the bottom edge of the plate or reference point, to add half the diameter of the other hole to the distance of its bottom edge from the bottom edge of the plate or reference point, and to subtract the height of the center of one hole, thus obtained, from the height of the center of the other hole, thus obtained, to see whether the two holes are at the proper center distance from one another. This is a tedious task especially in the case of a plate, such as a shaft end plate for a gear train, which has a great number of holes in it.

One object of the present invention is to simplify the measurement of the center distance of holes away from one another on any plane where a plurality of holes are provided in a workpiece.

Another object of the invention is to provide a simple attachment for a conventional height gauge, which may be employed to effect this simplified method of measurement.

Other objects of the invention will be apparent hereinafter from the specification and from the recital of the appended claims.

In the drawings:

Fig. 1 is a side elevation of my improved height gauge showing the gauge in position measuring the diameter and location of a hole;

Fig. 2 is a fragmentary plan view of the height gauge;

Fig. 3 is a fragmentary plan view of a detail, showing one end of the bracket or holder which supports the scissors type caliper of the gauge;

Fig. 4 is a section on a somewhat enlarged scale taken on the line 4—4 of Fig. 1 looking in the direction of the arrows;

Fig. 5 is a front view of the parts shown in Fig. 3;

Fig. 6 is a section on the line 6—6 of Fig. 3 looking in the direction of the arrows; and Fig. 7 is a side elevation showing a typical piece of work on which my heights gauge may be used with advantage.

Referring now to the drawings by numerals of reference, 20 denotes the base of my gauge. It has a column 21 extending upwardly therefrom; and there is an arm 22 slidably mounted on this column for vertical adjustment thereon. This arm can be secured to the column in any adjusted position by a set-screw 23. The column has a graduated scale extending along one vertical side of the column; and the arm has a vernier 28 readable against this scale. A collar 24, which is mounted to slide on the column 21 above the arm 22, is provided for adjustment of the vernier. This collar is connected to the arm 22 by an adjusting screw 25 that is manipulated by a knurled nut 26. The collar is adapted to be locked in position by a set-screw 26. All this is conventional construction in height gauges.

In my improved height gauge, an arm or bracket 32 is adjustably secured to the arm 22 by a collar 30 and a set-screw 31. The bracket 32 is right angular in shape and its free end extends vertically upward. It is formed at its upper extremity with journals or bearings 34 and 35 (Figs. 3, 4 and 5) adapted to receive the pivot and bearing pin 36 of a scissor type caliper 40 whose two arms 41 and 42 are journaled on the pin 36. The pin 36 is formed with an enlarged bearing portion at its left hand end, as viewed in Fig. 4, which seats in bearing 34 and provides a shoulder against which the scissor arm 42 rests.

Each of the scissors arms has a rounded, ball-type contact point 44 at its free end that is adapted to be engaged inside the hole of a plate to be measured. At their opposite ends each scissor arm is furcated, as shown at 45 in Figs. 1 and 2 and pivotally connected by means of a pin 46 to a block 47. The two blocks 47 are threadably engaged with a screw 48. Secured to the screw is a knurled disc 50.

Mounted on a post 55 which projects upwardly from the bracket 32 at one side of the longitudinal axis of the bracket is a conventional indicator 60. This indicator is provided with a graduated dial 61, and with an indicator or pointer 62 that registers against the graduations of the dial. The indicator is also provided with a spring-pressed pivotally mounted feeler 64 which is adapted to engage the upper face of the disc 50. The indicator is secured to the post 55 by a split clamp 65 which is tightened by a screw and knurled nuts 67.

The lower end of the screw 48 is removably anchored in a leaf spring 70 which is secured by a screw 71 to the arm or bracket 32. This leaf spring ordinarily urges the screw downwardly to disengage the disc 50 from the feeler 64, so as to prevent jarring the gauge 60 in transportation of the height gauge. The leaf spring 70 has a downturned end 72 which is adapted to engage the upper face of the arm 32 to limit the downward movement of the leaf spring and screw.

When it is desired to use the gauge of the present invention, the operator puts a block B of suitable thickness under the lower end of the screw 48 to lift the disc 50 into engagement with the feeler 64, and then adjusts the gauge 60 until pointer 62 reads zero against the graduations of dial 61. This levels the top of the disc 50 so that it lies in a horizontal plane which contains the center line of the calipers 40, and the center line of the bearing pin 36, and which is equidistant between the rounded, ball type contact points 44. Then the operator removes the block and inserts the contact points 44 of the caliper into one of the holes H of a work piece W, such as hole 10 (Fig. 7), adjusts the contact points of the caliper by rotating the knurled disc 50 until they contact opposite sides of the hole; and then adjusts the arm 22 vertically on the post 21 until the dial gauge reads zero. The reading on the scaled column 21 and the vernier 28 is then a reference reading to the exact center of the hole 10 just measured. Then the operator engages the points 44 in another hole of the work, such as hole 11, and if the new hole is of the same diameter as the hole originally gauged, as is the case with holes 10 and 11, adjusts the arm 22 vertically on the post 21 until the dial gauge again reads zero. The distance, which the arm 22 has had to be moved between the two holes, noted from scaled column 21 and vernier 28 is the distance between the centers of the two holes. By comparison of this distance with that required, it can be ascertained whether the holes are correctly located in the plate W.

If the holes are of different diameters, as is the case with holes 10 and 12, the scissors caliper 40 has, of course, to be adjusted between measurements. This is done by disc 50. Again, however, measurement of the vertical distance of the second hole (in this case hole 12) from first hole 10 is effected by adjusting arm 22 on column 21 until the gauge 60 reads zero, and then reading the scale on column 21 and vernier 28.

The location of other holes in the workpiece can be measured by again adjusting the arm 22, after points 44 have been engaged with diametrically opposite sides of a hole, until the gauge 60 reads zero. The reading on the scale of column 21 gives the vertical distance between the various holes.

As contrasted with the simple and easy way of measuring the vertical distance between holes which results from use of the apparatus of the present invention, it has heretofore been necessary to measure the height 14 of one hole 10 from the bottom edge 13 of the workpiece W, to caliper the diameter of the hole 10, to take half that diameter and to add it to height 14, thus giving the distance of the center of hole 10 above edge 13, then to measure the distance 15 or 16 of the bottom edge of another hole 11 or 12 above bottom edge 13 of the workpiece, to caliper the diameter of the hole 11 or 12, to add half this diameter to the measured distance of the height of the edge of the hole above edge 13, thus giving the distance of the center of the hole 11 or 12 above edge 13, and to subtract from the thus calculated distance of the center or hole 11 or 12 above edge 13 the calculated distance of the center of hole 10 above edge 13, thereby determining the distance between the holes. As contrasted with the prior method, therefore, applicant eliminates all calculations and reduces the number of measurements required materially. The apparatus of the present invention saves up to 80% in the gauging time on end plates for gear trains, for instance.

Obviously the apparatus of the present invention can be used without modification for measuring vertical distances between pins, or bosses or protrusions on a workpiece since contacts 44 can be employed for gauging outside as well as inside diameters. Obviously, also, the apparatus of the present invention can be used for measuring the horizontal as well as the vertical distances of holes away from one another simply by turning the workpiece on its side and measuring the distances of the holes relatively to one side edge of the workpiece in a manner similar to the described measurement of their distances relative to the bottom edge of the workpiece.

To make it easier to adjust the apparatus where holes of different diameters are being gauged, and also for transportation, the caliper 40 is made so that it can be removed from bracket 32. For this purpose, the leaf spring 70 is provided with a keyhole slot 73 and the base 74 of screw 48 is kerfed and is removably inserted in this slot. Also, pin 36 is adapted to be held removably in its bearings 34 and 35 by spring clips 75 (Fig. 3) which are pivotally mounted by means of screws 76 on the furcations at the upper end of the bracket 32. These clips when engaged over pin 36 lock the pin releasably and resiliently in position in its bearings 34 and 35. The clips 75 can be swung about screws 76, however, to horizontal positions as shown in Figs. 3 and 5, and as shown in dotted lines in Fig. 4, to permit the caliper 40 to be lifted off bracket 32. Caliper 40 can therefore be removed from bracket 32, can be inserted in a hole and adjusted to the diameter of the hole, and can then be resecured to bracket 32 to permit the other steps in measurement to be made. The measurement over the rounded, ball type contacts 44, when the caliper is inserted in the hole, is the inside diameter of the hole.

Thumb-tabs 77 are provided on clips 75 for easy manipulation thereof. A set of interchangeable calipers would cover all hole sizes.

When the workpiece has a shoulder like shoulder 80 of piece W' and the hole dimensions are given from that shoulder, a feeler 85 is employed to get a reference setting. This feeler has a pivot pin 86 integral with it which will go into the sockets 34 and 35 of bracket 32. It has a plane reference surface 87 lying in the plane of the center line of its pivot 86 and of its contact point 88. It has a post 90 that is engageable in key slot 73 in spring 70. Therefore feeler 85 can be mounted on arm 32 in place of the caliper 40.

After the feeler 85 is in position, feeler 64 of the dial gauge is engaged with surface 87, block B is put under spring 70 and the dial gauge is set to zero. The block B may then be removed. The reading of the scale on post 21 and of the vernier 28 is then noted. The caliper is then adjusted by feel in the hole H' to the proper diameter. Then the caliper 40 is put on arm 32 in place of feeler 85; and the arm 22 is adjusted on post 21 to bring the caliper into engagement with a hole of the workpiece. Then the arm 22 is adjusted on post 21 until the dial gauge reads zero. The difference in readings between this position and the reference reading gives the distance of the center line of the hole H' from shoulder 80.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A height gauge comprising a support, a bracket adjustable rectilinearly on said support, a caliper mounted on said bracket, said caliper having two scissor arms pivotally mounted on said bracket on a common pivot, each arm having a contact point at one end, adjustable connecting means carried by said bracket and connecting said arms at their opposite ends to adjust them about their pivot, a member secured to said connecting means, and gauging means carried by said bracket for gauging the position of said member.

2. A height gauge comprising a support, a bracket adjustable rectilinearly on said support, a pair of arms pivoted intermediate their ends on said bracket for movement about a horizontal axis and together constituting the arms of a capiler, said arms having contacts at one end, means adjustably connecting said arms at their opposite ends to move said contacts toward and from one another, said connecting means comprising a rigid member, and a dial gauge carried by said support and having a feeler adapted to engage said rigid member.

3. A height gauge comprising a support, a bracket adjustable rectilinearly on said support, a pair of arms pivoted intermediate their ends on said bracket for movement about a horizontal axis and together constituting the arms of a caliper, said arms having contacts at one end, means adjustably connecting said arms at their opposite ends to move said contacts toward and from one another, said connecting means comprising a nut pivoted on each arm, a screw threading through both nuts, a member rigidly connected to said screw, and means for mounting said screw on said bracket, and a gauge carried by said bracket and having a feeler for engaging said member.

4. A height gauge comprising a support, a bracket adjustable rectilinearly on said support, a pair of arms pivoted intermediate their ends on said bracket for movement about a horizontal axis and together constituting the arms of a caliper, said arms having contacts at one end, means adjustably connecting said arms at their opposite ends to move said contacts toward and from one another, said connecting means comprising a nut pivoted on each arm for movement about a horizontal axis, a screw threading through both nuts, means for supporting said screw on said bracket, and a disc secured to said screw for manually rotating said screw to adjust said arms, a dial gauge having a feeler adapted to be engaged with one side face of said disc, and means for supporting said dial gauge from said bracket.

5. A height gauge comprising a support, a bracket adjustable rectilinearly on said support, a pair of arms, a pivot pin connecting said arms intermediate their ends, said arms having contacts at one end, means adjustably connecting said arms at their opposite ends to move said contacts toward and from one another, said connecting means comprising a nut pivoted on each arm for movement about a horizontal axis, a screw threading through both nuts, and a disc secured to said screw for manually rotating said screw to adjust said arms, said arms, nuts, screw and disc constituting a caliper, means for removably securing said pin on said bracket to pivotally mount said caliper on said bracket, means for removably securing said screw to said bracket, and a dial gauge removably mounted on said bracket and having a feeler adapted to engage said disc.

6. A height gauge comprising a support, a bracket adjustable vertically on said support, a pair of arms, a pivot pin connecting said arms intermediate their ends, said arms having contacts at one end, means adjustably connecting said arms at their opposite ends to move said contacts toward and from one another, said connecting means comprising a nut pivoted on each arm for movement about a horizontal axis, a screw threading through both nuts, and a disc secured to said screw for manually rotating said screw to adjust said arms, said arms, nuts, screw and disc constituting a caliper, said pivot pin having bearing portions protruding at opposite ends beyond said arms, means for removably securing said pivot pin on said bracket comprising a pair of spring clips pivotally mounted on said bracket and adapted to be swung from a position of engagement with said bearing portions to a position of disengagement therefrom, means for removably securing said screw to said bracket comprising a leaf spring member secured to said bracket and having a keyhole slot therein to removably receive the base of said screw, and a dial gauge removably mounted on said bracket and having a feeler adapted to engage said disc.

7. The method of measuring the center distance between two holes in a workpiece which comprises employing a dial gauge and a caliper which are mounted to be movable together, zeroizing the dial gauge with reference to the caliper, adjusting the caliper into engagement with one of said holes, then zeroizing the dial gauge by adjustment of the dial gauge and caliper together, then engaging the caliper with the other hole by bodily adjustment of the caliper and dial gauge together, and continuing the last-named adjustment of the caliper and gauge together until the gauge again reads zero, the amount which the caliper and gauge have been adjusted, between the last-named zero reading of the gauge and the second-named zeroized reading being the center distance between the two holes.

No references cited.